April 15, 1941.  E. C. SCHAVEY  2,238,292
FISH LURE
Filed May 1, 1939  2 Sheets-Sheet 1
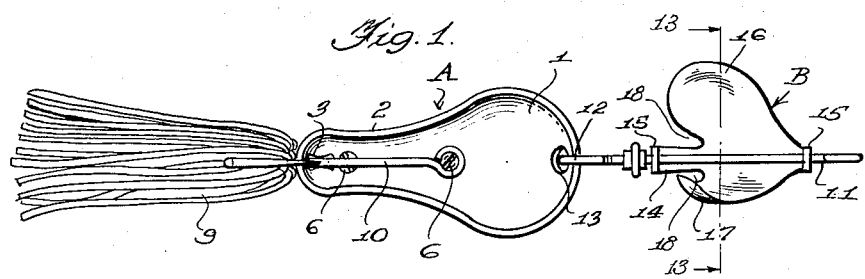
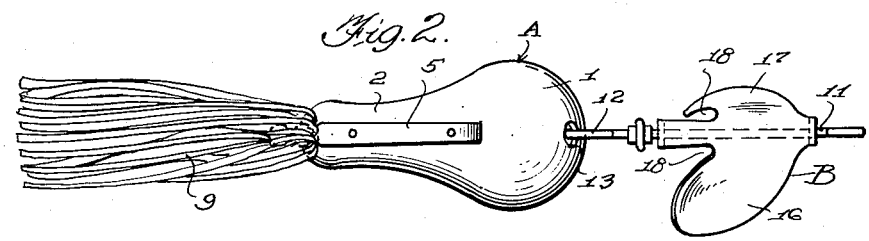
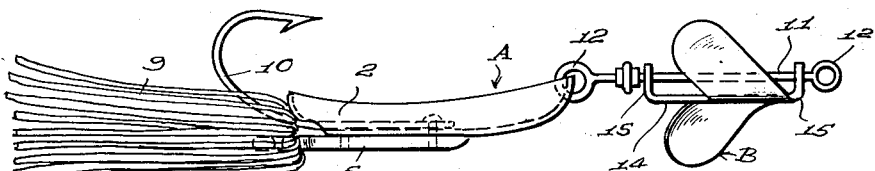
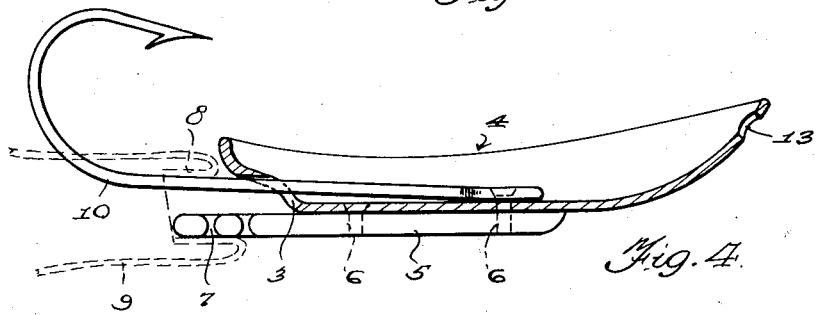
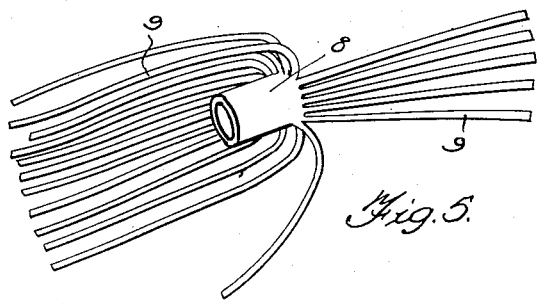
Inventor
EARL C. SCHAVEY,
By Clarence A. O'Brien
and Hyman Berman
Attorneys

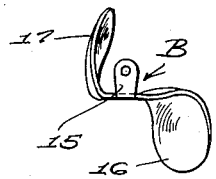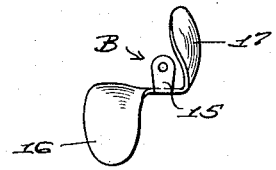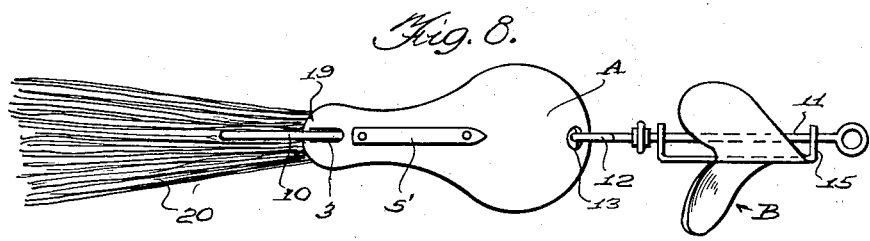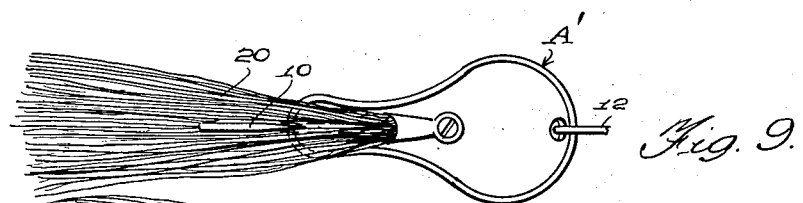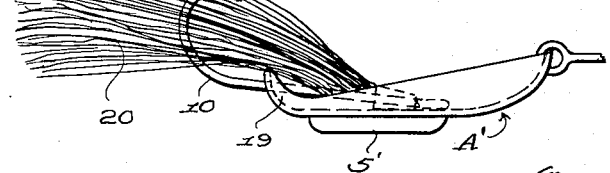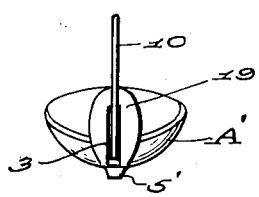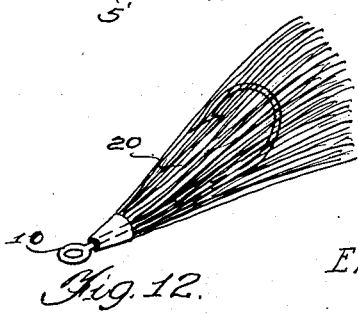

Patented Apr. 15, 1941

2,238,292

UNITED STATES PATENT OFFICE 2,238,292

FISH LURE

Earl Christophel Schavey, Shreveport, La.

Application May 1, 1939, Serial No. 271,151

4 Claims. (Cl. 43—42)

This invention relates to a fish lure, the general object of the invention being to form the lure with a spoon or body and a propeller or spinner in front of the body with the parts so constructed and arranged that the device will travel on the surface and make a certain amount of noise and also disturb the water which results in attracting fish thereto.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a top plan view of the invention.

Figure 2 is a bottom plan view thereof.

Figure 3 is a side view thereof.

Figure 4 is a longitudinal sectional view through the body of the device.

Figure 5 is a view of the slitted rubber member.

Figure 6 is a view looking toward one end of the propeller or spinner.

Figure 7 is a view looking toward the opposite end thereof.

Figure 8 is a bottom plan view showing a modified form of body.

Figure 9 is a top plan view of Figure 8 with the spinner removed.

Figure 10 is a side view of Figure 9.

Figure 11 is a view looking toward the rear end of the body shown in Figure 10.

Figure 12 is a view of a hook with a "bucktail" thereon.

Figure 13 is a section on the line 13—13 of Figure 1.

In these drawings the letter A indicates the body or spoon part of the device and said body is formed with an enlarged head part 1 of substantially cup shape and a tail part 2 which is of channel shape in cross section, said tail part tapering toward its rear end and said rear end is closed but is formed with a slot 3. The edge walls of the body are slightly bowed inwardly as shown at 4. A stabilizer consisting of a bar 5 is attached to the bottom of the body by means of screws 6 and said bar may project from the rear end of the body as shown in Figures 1, 2, 3 and 4 or it may terminate short of the rear end of the body as shown at 5' in Figures 8, 9 and 10.

When the bar projects from the rear end of the body the projecting part is formed with the recesses 7 for facilitating the attachment of a flexible member thereto. This flexible member may be pork rind, feathers or the like. Figures 1 to 5 show this flexible member as formed of a rubber sleeve 8 provided with longitudinally extending slits in its major portion for forming the plurality of strips 9. The unslitted part of the sleeve may encircle the projecting part of the bar and a portion of the shank of the fish hook 10 or said sleeve may simply be attached to either the projecting part of the bar or the shank of the fish hook. The shank of the fish hook passes through the slot 3 and its eye is engaged by the forward screw 6 with the hook part curving under the rear end of the body.

A shaft or rod 11 is formed with the eyes 12 at its ends, one of which passes through a hole 13 in the front end of the body and the other receives the line or a swivel to which the line is to be attached. A propeller or spinner B is rotatably arranged on the shaft or rod 11 and said propeller or spinner includes an elongated part 14 having its ends bent at right angles as shown at 15 and said ends perforated to receive the shaft or rod 11 and substantially cup-shaped wings or blades 16 and 17 extend from opposite sides of the part 14 with the wing 17 extending substantially at right angles to the part 14, with the wing 16 gradually curving outwardly in an opposite direction from the wing 17. The wing 17 is shorter than the wing 16 and said wing 16 is of substantially spiral shape. These wings at the rear edges form with the rear part of the portion 14 openings 18 for the escapement of water engaged by the wings.

Figures 8, 9 and 10 show the rear end of the tail part of the body A' as curving as shown at 19 and the "buck-tail" or other flexible member 20 attached to the front end of the shank of the hook so that the front part of this tail is located in the member A' and extends over this part 19 with portions of the "buck-tail" practically enclosing the curved part of the hook.

When this device is pulled through the water it will tend to ride on the surface of the water with the stabilizer bar holding the body of the spoon in a partly upright position and the water entering the head part 1 will pass through the tail part 2 and the propeller or spinner will, of course, rotate as the device is being pulled through the water and the peculiar construction of this propeller will throw the water several inches above the surface and the water escaping through the openings 18 will make a popping noise. The bait will travel along the surface of the water without any undue effort or skill on the part of the caster. The device gives an appearance of a minnow trying to catch a bug on the surface of the water and this attracts the fish and causes them to strike the lure. The device can be colored in various ways to make it more attractive to the fish and the wings 16 and 17 can be bent to cause the spinner to rotate in a clockwise direction or in an anti-clockwise direction as desired.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A fish lure of the class described comprising a body having a head part of substantially cup shape and a tail part of channel shape in cross section, a stabilizer connected with the bottom of the tail part, means for connecting a fish hook to the body, a shaft connected to the front end of the body, a propeller carried by the shaft, said propeller including a substantially centrally arranged part having its ends bent at right angles in the same direction and perforated to receive the shaft, and a pair of wings extending outwardly from opposite sides of said centrally arranged portion with one wing bent at substantially right angles and the other wing curving outwardly and in an opposite direction to the first wing, said wings being of substantially cup shape and forming openings where their rear edges join the centrally arranged part.

2. A fish lure of the class described comprising a body having a head part of substantially cup shape and a tail part of channel shape in cross section, a stabilizer connected with the bottom of the tail part, means for connecting a fish hook to the body, a shaft connected to the front end of the body, a propeller carried by the shaft, said stabilizer consisting of an elongated bar extending beyond the rear end of the body and said rear end of the body having an opening therein through which the shank of the fish hook passes, and means for attaching a flexible member to the rear end of the device.

3. A fish lure of the class described comprising a body having a head part of substantially cup-shape and a tail part of channel shape in cross section, a stabilizer connected with the bottom of the tail part, means for connecting a fish hook to the body, a shaft connected to the front end of the body, a propeller carried by the shaft, said stabilizer being in the form of an elongated bar extending longitudinally of the body with the rear end of the body curving upwardly, and a flexible member connected with the shank of the fish hook, and extending under the upwardly curved part, said upwardly curved part having a slot therein through which a portion of the shank of the fish hook passes.

4. In a lure of the class described, a rotary spinner including a substantially centrally arranged part having its ends bent at right angles in the same direction and perforated to receive a shaft, and a pair of wings extending outwardly from opposite sides of said centrally arranged portion with one wing bent at substantially right angles and the other wing curving outwardly and in an opposite direction to the first wing, said wings being of substantially cup-shape with the wings slightly twisted to place the concavities formed by the cup-shaped parts in position to be engaged by the water as the lure travels through the water, the wings forming openings where their rear edges join the centrally arranged part.

EARL C. SCHAVEY.